United States Patent Office 3,138,559
Patented June 23, 1964

3,138,559
METHOD FOR THE PREPARATION OF A CATALYST COMPOSITION BY THE REACTION OF A FLUOROCARBON WITH ACTIVATED ALUMINA
Murray Hauptschein, Glenside, and Arnold H. Fainberg, Elkins Park, Pa., assignors to Pennsalt Chemicals Corporation, Philadelphia, Pa., a corporation of Pennsylvania
No Drawing. Filed Mar. 30, 1960, Ser. No. 18,505
11 Claims. (Cl. 252—442)

This invention relates to a new catalyst composition useful particularly for the catalytic disproportionation and rearrangement of fluorine containing alkanes.

The fluorine containing alkanes, particularly the fluorochloroalkanes such as $CF_2Cl_2$, $CF_3Cl$, $CF_2ClCFCl_2$ and $CF_2ClCF_2Cl$, etc., are widely used as refrigerants, heat transfer fluids, dielectric fluids, aerosol propellants and the like. Commercially, these and similar compounds are commonly prepared by fluorination of chlorinated starting materials, such as carbon tetrachloride or perchloroethylene with hydrogen fluoride in the presence of fluorine containing metal salts such as antimony chlorofluorides.

One disadvantage of such prior processes is that both the hydrogen fluoride and the catalyst employed are highly corrosive and require special equipment and handling precautions. As the fluorination proceeds from the lower to the more highly fluorinated products it is necessary to employ more and more drastic conditions to introduce additional fluorine, still further increasing the corrosion and handling problems. Another drawback is the necessity of separating hydrogen fluoride from the products following the fluorination reaction.

There is accordingly a distinct need for a method of preparing such fluorinated alkanes, particularly those of higher fluorine content, under less drastic, less corrosive and more convenient conditions.

In accordance with the present invention, a catalyst has been discovered with displays high activity over long periods of use for the disproportionation of fluorine containing alkanes to those of higher fluorine content and for promoting various rearrangement reactions of fluorinated alkanes, such that desired isomeric forms of such compounds may be readily obtained.

In accordance with the invention, such a catalyst is prepared by treating activated alumina with a lower fluorocarbon (i.e., a relatively low molecular weight fluorine containing carbon compound) containing not more than one hydrogen atom at an elevated temperature and continuing the treatment until the evolution of carbon oxides has substantially ceased. During the course of such treatment, an exothermic reaction occurs accompanied by the evolution of carbon monoxide and/or carbon dioxide together in some cases with variable amounts of other products. When the evolution of carbon oxides has substantially ceased, the catalyst is ready for use.

With the catalyst of the invention, disproportionation and rearrangement of fluoroalkanes may be accomplished by simply passing the fluorinated alkane over the catalyst in the vapor phase and recovering the disproportation and rearrangement products. Hydrogen fluoride is not employed as a starting material nor evolved during the catalytic treatment. Thus, handling of this material as well as fluorine containing metal salts is entirely eliminated.

Activated alumina which is required in the preparation of the catalyst of the invention, is characterized, as is well recognized in the art, by its relatively high surface area as distinguished from non-activated forms such as corundum or alpha alumina which are dense, low-surface materials. Typically, activated aluminas may have surface areas ranging, e.g., from 10 to 300 square meters per gram.

As is well known, activated aluminas are generally prepared by the controlled dehydration or calcination of hydrated aluminas which may be natural or synthetic. Thus, for example, the controlled calcination of alpha alumina trihydrate or beta alumina trihydrate will produce a highly porous structure having high internal surface area. The hydrated alumina starting material may be natural, such as bauxite, or synthetically prepared such as by the precipitation of aluminum nitrate, aluminum sulfate or other soluble aluminum salt to produce a hydrated alumina gel which is then washed and calcined under control temperature conditions to produce the activated form.

It is highly preferred to employ essentially unmodified activated alumina, that is an activated alumina which contains at the most small amounts e.g. one to two percent of other materials (other than inert residues such as carbon from binders and the like). Desirably, the alumina should be low in $Na_2O$ and $Fe_2O_3$. Although essentially unmodified activated alumina is preferred, in some case it may prove desirable to employ an activated alumina containing minor amounts, e.g., from one to twenty percent, of other metals or metal oxides, such as chromium oxide, cobalt oxide, molybdenum oxide and the like. The presence of such metals or metal oxides will often modify the selectivity and/or activity of the catalyst in a given reaction.

The lower fluorocarbons used in the treatment of the activated alumina are relatively low molecular weight fluorine containing carbon compounds generally not containing more than about 8 carbon atoms and preferably of the order of from 1 to 4 carbon atoms. The treatment of the activated alumina with the fluorocarbon to produce the catalyst of the invention should be conducted in the vapor phase and it is generally impractical therefore to employ higher molecular weight fluorocarbons which are difficult or impracticable to handle in the vapor phase.

As pointed out above, the fluorocarbon employed for the preparation of the catalyst should not contain more than one hydrogen atom. Apparently, the presence of multiple hydrogen atoms in the molecule interferes with the activation reaction. Thus, for example when the fluorine containing compound $CH_3CF_2Cl$ is passed over activated alumina at a temperature of about 300° C., reaction apparently does occur as evidenced by the evolution of $H_2O$ and $CH_2=CClF$. Carbon oxides, however, are not evolved and the alumina so treated, when tested as a catalyst in the disproportionation or rearrangement of fluoroalkanes shows essentially no activity.

Preferred fluorocarbons for the treatment of the activated alumina to produce the catalyst of the invention are those which in addition to carbon and fluorine contain only elements selected from the class consisting of chlorine and hydrogen, particularly fluoroalkanes of this type. Thus, included in this group are perfluorocarbons (i.e., containing only fluorine and carbon), perfluorochlorocarbons (i.e., containing only carbon, fluorine and chlorine); perfluorohydrocarbons (i.e., containing only carbon, fluorine and hydrogen); and perfluorochlorohydrocarbons (i.e., containing only carbon, fluorine, chlorine and hydrogen); provided always that not more than one hydrogen atom is present in the molecule.

Particularly preferred are the lower perfluorochloroalkanes (i.e., alkanes containing only the elements carbon, fluorine and chlorine). Desirably, the perfluorochloroalkanes employed should have one to six and preferably from one to three carbon atoms. Such compounds have been found to impart high activity to the catalysts, are readily available, and relatively cheap, particularly the perfluorochloroalkanes containing one and two carbon atoms.

Specific examples of fluorocarbons suitable for the treatment of the activated alumina to produce the catalysts of the invention are $CF_2ClCFCl_2$; $CF_3CCl_3$; $CF_2ClCF_2Cl$; $CF_3CFCl_2$; $CFCl_2CFCl_2$; $CF_2ClCCl_3$; $CF_2Cl_2$; $CF_3Cl$; $CFCl_3$; $CF_2HCl$; $CF_3CFClCF_2Cl$; $C_3Cl_3F_5$; $CF_3CF_2Cl$; $CHF_3$;

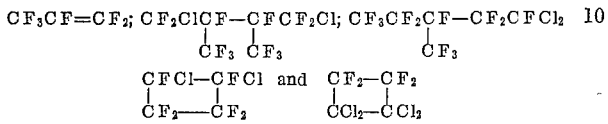

In the preparation of the catalyst, before treatment with the fluorocarbon, it is desirable first to dry the alumina to remove adsorbed moisture. This may be accomplished by heating the activated alumina to a temperature of, e.g., 300° to 600° C., preferably 350° to 550° C., for a sufficient time to insure the elimination of any free water, e.g., from 5 minutes to 5 hours. Desirably, during the drying operation, the activated alumina is swept with a stream of an inert gas such as nitrogen.

The treatment of the activated alumina with the fluorocarbon is carried out in the vapor phase at elevated temperatures usually ranging from about 150° C. to 800° C. and preferably from 200° C. to 500° C. In most cases, particularly with the fluorochlorocarbons having from 1 to 3 carbon atoms, the optimum activation temperature, giving catalysts of optimum activity, will range from about 250° C. to 450° C.

An exothermic reaction occurs between the fluorocarbon and the alumina as evidenced by a rise in temperature in the catalyst bed. The minimum temperature at which such a reaction may be initiated will vary depending upon the fluorocarbon employed. Reaction may be initiated at temperatures as low as 150° F. with materials such as $CF_2HCl$ whereas with materials such as $CF_2Cl_2$ or $CF_2ClCFCl_2$, minimum temperatures of about 200° C. are generally required to initiate the reaction. In other cases, still higher temperatures may be required to initiate reaction.

The maximum temperature during the activation treatment should not exceed about 800° C. to avoid damage to the catalyst. Indeed, in order to avoid reduction of activity, the catalyst should not be permitted to remain at temperatures above about 500° C. for substantial periods of time during the activation treatment. Thus, while temperatures of the order of 600 to 800° C. for a few minutes resulting, e.g., from the exotherm of the reaction may be tolerated, longer periods at these high temperatures may damage the catalyst.

The principal gaseous reaction products during the activation treatment are carbon oxides. These may be in the form of carbon monoxide, carbon dioxides or both and/or in the form of carbon oxide addition products, particularly $COCl_2$ and/or $COClF$. It is understood that the term carbon oxide is intended to include such addition products as well as carbon dioxide and carbon monoxide. Other products such as tetrachloroethylene, chlorine, hexachloroethane, carbon tetrachloride, chloroform and chlorofluoroalkanes may also be produced.

Where the treatment of the activated alumina with the fluorocarbon is carried out in a fixed bed, the reaction appears to proceed from the input to the exit of the bed as evidenced by the appearance of a hot zone which travels down the bed in the direction of the gas flow. This hot zone results from the rather strong exothermicity of the activation reaction and care should be taken to avoid the excessive temperatures in the hot zone where apparently most of the reaction is taking place. As pointed out above maximum bed temperatures in excess of about 800° C. should be avoided, and for best results, the catalyst bed temperatures should not be permitted to remain above about 500° C. for substantial periods of time. The maximum temperature reached in the hot zone will depend upon the initial catalyst bed temperature, the temperature and rate of flow of the activating fluorocarbon, the bed dimensions and the like. In order to control maximum bed temperatures during the activation treatment it may be desirable to dilute the fluorocarbon vapors employed for the activation with an inert gas such as nitrogen in order to moderate the exothermicity of the reaction and/or to employ means such as cooling tubes inserted in the catalyst bed in order to remove the heat of reaction during the course of the activation treatment.

Completion of the activation treatment is signaled by a sudden drop, or substantial cessation of the generation of carbon oxides. The generation of carbon oxides may continue subsequently during the use of the catalyst, but the rate of generation is very low relative to the rate of generation during the activation treatment. In fixed bed operations, the completion of the activation may also be observed by the hot zone reaching the exit end of the bed. Depending on the activating agent, the initiation of the activation reaction may occur at a temperature lower than that required to fully activate the catalyst. In such cases it may be necessary or desirable to successively raise the activation temperature (but not above about 800° C.) until the evolution of carbon oxides has substantially ceased.

The time required to complete the activation will depend somewhat upon the temperature employed, the catalyst size, the length and other dimensions of the catalyst bed and the like. Typical activation times under normal conditions may range, e.g., from 5 minutes to 5 hours.

During the activation procedure, fluorine derived from the activating fluorocarbon is apparently "fixed" in the activated alumina which shows a weight increase (dry basis) during the activation procedure generally ranging from 1% to 40%, and more usually from about 3% to 20%. During subsequent use, the catalyst may continue to show a very gradual additional increase in weight when used e.g. in the disproportionation or rearrangement of fluorochloroalkanes.

The pressure during the activation treatment is not critical except in the sense that the treatment should be carried out in the vapor phase and accordingly superatmospheric pressures sufficiently high to cause condensation of the reactants or reaction products on the catalyst at the operating temperature employed should be avoided. While atmospheric pressure operation will often be most convenient and economical, subatmospheric and moderate super-atmospheric pressures ranging, e.g., from one-tenth of an atmosphere to ten atmospheres may be sometimes desirable.

After the catalyst has been prepared by the treatment described above, it is ready for use such as in the rearrangement and disproportionation of fluorine containing alkanes. Illustrative of the many reactions that are catalyzed by the catalyst of the invention is the disproportionation and rearrangement of perfluorochloroethanes, e.g., the following reactions:

(a) $CF_2ClCFCl_2 \rightarrow CF_3CCl_3$ (rearrangement)

(b) $CF_2ClCFCl_2 + CF_3CCl_3 \rightarrow C_2Cl_2F_4 + C_2Cl_4F_2$ (disproportionation)

(c) $2CF_2ClCFCl_2 \rightarrow C_2Cl_2F_4 + C_2Cl_4F_2$ (disproportionation)

(d) $2CF_3CCl_2F \rightarrow CF_3CClF_2 + C_2Cl_3F_3$ (disproportionation)

(e) $CF_2ClCF_2Cl \rightarrow CF_3CFCl_2$ (rearrangement)

(f) $2CF_3CFCl_2 \rightarrow CF_3CF_2Cl + C_2Cl_3F_3$ (disproportionation)

(g) $CF_2Cl_2 \rightarrow CF_3Cl + CFCl_3$ (disproportionation)

(h) $2CF_2HCl \rightarrow CHF_3 + CHCl_2F$ (disproportionation)

Reactions a to f, involving the disproportionation and rearrangement of perfluorochloroethanes and similar reactions promoted by the catalyst of the invention are more fully described and claimed in copending U.S. application Serial No. 21,112, filed April 11, 1960, now U.S. 3,087,974, by Murray Hauptschein and Arnold Fainberg.

Reaction g and similar reactions involving the disproportionation of perfluorochloromethanes are more fully described and claimed in copending U.S. application Serial No. 21,589, filed April 12, 1960, now U.S. 3,087,975, by Murray Hauptschein and Arnold Fainberg.

Reaction h and similar reactions involving the disproportionation of monohydrochlorofluoromethanes over the catalyst of the invention are described and claimed in copending U.S. applicaiton, Serial No. 24,672, filed April 26, 1960, now U.S. 3,087,976, by Murray Hauptschein and Arnold Fainberg.

Other uses for the catalyst of the invention include, e.g., the replacement fluorination of chlorine containing alkanes such as $CHCl_3$, $CCl_4$, $CF_2Cl_2$, $CH_2Cl_2$, $CF_3CCl_3$, $CFCl_2CFCl_2$ or $CCl_3F$ with hydrogen fluoride as the fluorinating agent.

The remarkable catalytic activity of the catalysts of the invention particularly for the disproportionation and rearrangement of fluorine containing alkanes, is not entirely understood. They generally have considerably higher activity for such reactions than previously known catalysts containing aluminum and fluorine, such as aluminum fluoride prepared, e.g., by fluorination of aluminum chloride or alumina with hydrogen fluoride. Apparently, the aluminum and the fluorine in the catalyst of the invention are associated in a different manner than in these prior catalysts.

Aside from its simplicity of preparation and mode of use, the catalysts of the invention also have the advantage of relatively long life. Many catalysts prepared in accordance with the invention have been found to be still very active after several hundred hours of operation. When after prolonged operation in the disproportionation and/or rearrangement of fluorine containing alkanes the activity of the catalyst begins to decline, it is apparently the result of the gradual deposition of carbon. When this occurs the activity of the catalyst can be readily restored by a relatively simple regeneration procedure involving the passage of oxygen or oxygen containing gases (e.g., air), over the catalyst at temperatures from 300° C. to 800° C. and preferably from 350 to 500° C. This results in the oxidation of the deposited carbon restoring the catalyst to essentially its original activity. Excessive temperatures should be avoided during the regeneration procedure so as to avoid damaging the catalyst.

The following examples are intended to illustrate the invention:

*Example 1*

An activated alumina was employed in the form of ⅛″ x ⅛″ cylindrical pellets containing over 99% ($H_2O$ free basis) of alumina and low in sodium, iron and silica (0.03% $Na_2O$; 0.08% $Fe_2O_3$; 0.22% $SiO_2$). Before drying it has a 26% weight loss on ignition at 1000° C. and a surface area of 231 square meters per gram.

The above activated alumina was dried by heating to 500° C. while sweeping with nitrogen for about one hour resulting in the loss of 9.7% by weight of water, based on dry weight.

After drying, the activated alumina, in an electrically heated tube was treated with $CF_2ClCFCl_2$ vapors at a space velocity of 180 volumes of $CF_2ClCFCl_2$ vapor (at standard conditions of temperature and pressure) per hour per volume of alumina for a period of 0.8 hour. The bed was maintained on average temperature of about 300° C. during the treatment. At the outset a hot zone approximately 50° C. hotter than the average bed temperature formed at the inlet to the bed and moved progressively down the bed toward the exit as the activation treatment proceeded.

During the activation treatment the principal products were a mixture of carbon dioxide and carbon monoxide in the ratio of about 2:1 together with smaller amounts of tetrachloroethylene. At the end of about 0.8 hour, the evolution of carbon oxides suddenly ceased simultaneously with the appearance of the hot zone at the exit end of the bed. During this treatment the activated alumina increased in weight by about 16% based on dry weight. This catalyst is highly active for the rearrangement and disproportionation of fluoroalkanes. For example, when the fluorochloroethane $CF_2ClCFCl_2$ used in the activation treatment is passed over this catalyst at temperatures of about 300° C., rearrangement and disproportionation Reactions a and b above take place in high conversions and yields.

*Example 2*

An activated alumina of the type used in Example 1 in the form of ⅛″ x ⅛″ cylindrical pellets was heated in a fixed bed at 500° C. for 1 hour in a stream of nitrogen. The bed was then cooled to about 260° C. A stream of nitrogen was bubbled through liquid $CF_2ClCFCl_2$ at about −10° C. and this stream of nitrogen-diluted $CF_2ClCFCl_2$ was then passed through the bed at a space velocity (based upon $CF_2ClCFCl_2$) of about 50 volumes of $CF_2ClCFCl_2$ vapor per volume of alumina per hour. Under these conditions a mild exotherm was noted in the bed, the temperature rising approximately 25° C. over the initial bed temperature of 260° C. As the treatment continued, the hot zone of the bed moved progressively down stream toward the exit. The product gases from the activation treatment were principally carbon dioxide and carbon monoxide in the ratio of approximately 2:1 with lesser amounts of tetrachloroethylene. The completion of the activation was shown by the sudden virtual cessation of generation of CO and $CO_2$ and by the appearance of hot zone at the exit of the bed. The catalyst prepared in this manner is highly active in the rearrangement and disproportionation of fluorochloroalkanes.

*Example 3*

Activated alumina of the type used in Example 1 in the form of ⅛″ x ⅛″ pellets was heated to 500° C. for 1.3 hours while sweeping with nitrogen, driving off 10% by weight of water. A stream of vapors of $CF_3CFCl_2$ were then passed through the bed at a space velocity of 170 volumes of $CF_3CFCl_2$ (at standard conditions) per volume of alumina per hour while maintaining the average bed temperature at about 400° C. Vigorous reaction occurred, a hot zone moving down the bed as previously described, the temperature at the hot zone rising at some points to a maximum of 450° C. The principal gaseous product of the activation were carbon monoxide and carbon dioxide in the ratio of 1:2 at the start falling to 1:4 near the end. Activation was complete in 1.5 hours after which the catalyst was tested and shown to have high activity for the disproportionation and rearrangement of fluorine containing alkanes.

*Example 4*

Activated alumina of the type employed in Example 1 in the form of cylindrical ⅛″ x ⅛″ pellets was heated at 500° C. for 1 hour while sweeping with nitrogen, driving off 9.8% of water. The bed temperature was reduced to 300° C. and at this temperature a stream of $CF_2ClCF_2Cl$ vapors was passed through the bed at a space velocity of 200 volumes of $CF_2ClCF_2Cl$ per volume of alumina per hour. Activation treatment was continued under these conditions for 1.2 hours while the evolution of CO and $CO_2$ in the ratio of 1:2.5 as the principal gaseous products. After 1.2 hours the temperature was raised to 400° C.; activation was complete in 1.5 hours. Only a trace of tetrachloroethylene was formed during activation. The catalyst thus activated had high activity for the disproportionation and rearrangement of fluorine containing alkanes.

*Example 5*

Activated alumina in the form of ⅛″ x ⅛″ pellets containing precipitated chromium oxide was employed, analyzing as follows on an $H_2O$ free basis:

| | | |
|---|---|---|
| $Cr_2O_3$ | percent | 19.7 |
| $Na_2O$ | do | 0.6 |
| $SiO_2$ | do | 0.15 |
| $CuO$ | do | 0.005 |
| $Fe_2O_3$ | do | 0.08 |
| $Ni_2O$ | do | 0.005 |
| $Al_2O_3$ | | Remainder |

A bed of this alumina was heated to a temperature of 500° C. while sweeping with nitrogen for 1 hour resulting in a weight loss of 0.9% $H_2O$. While maintaining the bed temperature at approximately 400° C., a stream of vapors of $CF_2ClCFCl_2$ was passed through the bed at a space velocity of 180 volumes of $CF_2ClCFCl_2$ (at standard conditions) per volume of alumina per hour. After about 1 hour, the generation of carbon oxides ceased and activation was complete. This catalyst showed good activity in the disproportionation of fluorine containing alkanes.

*Example 6*

Activated alumina of the type employed in Example 1 in the form of ⅛" x ⅛" pellets was soaked in water over night, drained of excess water and charged into a heated tube reactor. The bed was heated to 400° C., allowing the bulk of the water to steam out. It was then subjected to a reduced pressure (about 0.1 mm. Hg) for 3 hours at 350° to 400° C. and then allowed to cool to 300° C. under vacuum. Following this treatment a stream of vapors of $CF_2ClCFCl_2$ were passed through the bed at a space velocity of about 170. Large amounts of $CO_2$ were evolved and a vigorous exotherm occurred in a hot zone which moved down the bed as the reaction progressed from the input to the exit reaching a maximum of about 390° C. Activation was complete in about 40 minutes. This catalyst was found to be highly active in the disproportionation and rearrangement of fluorine containing alkanes.

*Example 7*

An activated alumina was employed in the form of ⅛" x ⅛" pellets having the following analysis on a $H_2O$ free basis:

| | | |
|---|---|---|
| $Al_2O_3$ | percent | 95.7 |
| $SiO_2$ | do | 0.5 |
| $Fe_2O_3$ | do | 0.18 |
| $Na_2O$ | do | 0.1 |
| $SO_4^=$ | do | 0.4 |
| $Cl^-$ | do | 0.1 |
| Carbon (residue of carbonaceous binder) | do | 2.0 |
| Surface area (square meters per gram) | | 180–200 |

This alumina was heated to 500° C. for 1.5 hours while sweeping with nitrogen resulting in the loss of 7.8% of $H_2O$. The alumina bed temperature was then reduced to 400° C. and treated with $CF_2ClCFCl_2$ vapors at a $$CF_2ClCFCl_2$$

space velocity of 180. During the activation treatment large amounts of carbon monoxide and carbon dioxide were evolved in a molar ratio of about 1:2 together with tetrachloroethylene in sizable amounts. Activation was complete in about 1 hour. The catalyst showed high activity in the disproportionation and rearrangement of fluorine containing alkanes.

*Example 8*

An activated alumina in the form of ⅛" x ⅛" pellets similar to the alumina employed in Example 1 but having precipitated thereon 3.5% of cobalt oxide and 10% of molybdenum oxides was charged to an electrically heated reactor tube, heated to a temperature of 500° C. for 1 hour while sweeping with nitrogen to drive off 11.5% of $H_2O$. The bed temperature was then reduced to 300° C. and the bed was treated with $CF_3CFCl_2$ vapors at a space velocity of 170 volumes of $CF_3CFCl_2$ per volume of catalyst per hour. A vigorous exothermic reaction took place resulting in the evolution of major amounts of $CO_2$ and $CO$ and small amounts of $CF_3CCl_3$. During the activation treatment vari-colored smokes were also evolved apparently from reaction with the deposited metal oxides. Activation was continued for about 40 hours at 300° C. until no additional smoke was evolved. The catalyst was active in the disproportionation of fluorine containing alkanes.

*Example 9*

An activated alumina of the type employed in Example 1 in the form of ⅛" x ⅛" pellets was heated to a temperature of 500° C. for 1 hour while sweeping with nitrogen to dry. It was then cooled to 150° C. and $CHClF_2$ vapors were passed over it at a space velocity of 260 volumes of $CHClF_2$ (at standard conditions) per hour per volume of alumina. A large amount of carbon monoxide was produced initially, no $CO_2$ being detected. Activation occurred rapidly; in 4 minutes the treated alumina was already quite active in promoting the disproportionation of $CHClF_2$ to $CHF_3$. In about 20 minutes the carbon monoxide production had fallen off to a negligible level, but when the reaction temperature was successively increased to 200° C., 250° C., and 300° C., at each level a new burst of carbon monoxide was produced for a limited time. At 300° C. after 1.5 hours, carbon monoxide production dropped to a very small value. This catalyst was found to be very active in promoting the disproportionation and rearrangement of fluorine containing alkanes.

*Example 10*

Activated alumina of the type employed in Example 1 in the form of ⅛" x ⅛" pellets was charged to a heated tube reactor and heated to a temperature of 500° C. for 1 hour while sweeping with nitrogen to dry it. The alumina bed was then cooled to 290° C. and $CCl_2F_2$ vapors were passed through the bed at a space velocity of 200 volumes of $CCl_2F_2$ per volume of alumina per hour. The principal gaseous products of the activation treatment were $CO_2$ as well as smaller amounts of $COCl_2$. No carbon monoxide was detected. Activation was essentially complete in about 20 minutes, the $CO_2$ production dropping to a low value. This catalyst was found to be highly active in promoting the disproportionation and rearrangement of fluorine containing alkanes.

*Example 11*

A high purity activated alumina in the form of ⅛" x ⅛" pellets was employed having the following analysis ($H_2O$ free basis):

| | | |
|---|---|---|
| Ca+Mg | | 0.015%. |
| Cu | | 0.001%. |
| Ni | less than | 0.001%. |
| V | less than | 0.001%. |
| Mo | less than | 0.001%. |
| Na | | 0.001%. |
| Fe | | 0.0075%. |
| Cr | less than | 0.001%. |
| Pb+Sn | | 0.001%. |
| Si | | 0.004%. |
| K | less than | 0.001%. |
| $Al_2O_3$ | | Remainder. |
| Loss on ignition at 1750° F | | 3%. |
| Surface area (square meter per gram) | | 230. |

The above alumina was charged to a heated tube and dried for 1 hour while sweeping with nitrogen at 400° C. resulting in a 5.8% loss of $H_2O$ (based on dry weight). The bed was then cooled to 300° C. and treated with a mixture of 27% $CF_2ClCF_2Cl$ and 73% $CF_3CFCl_2$ in vapor phase at a $C_2Cl_2F_4$ space velocity of 170 volumes per volume of alumina per hour for about 18 minutes during which CO and $CO_2$ were evolved at a rapidly diminishing rate. The $C_2Cl_2F_4$ space velocity was decreased to 40 and treatment was continued for an additional 1.7 hours during which time small amounts of CO, $CO_2$ and $C_2Cl_3F_3$ were evolved. The alumina gained about 3% in weight during the activation treatment and was found to be very active for the rearrangement and disproportionation of fluorine containing alkanes such as the rearrangement of $CF_2ClCFCl_2$ to $CF_3CCl_3$ and the disproportionation of $C_2Cl_3F_3$ to $C_2Cl_2F_4$ and $C_2Cl_4F_2$.

*Example 12*

A catalyst prepared in accordance with Example 1 was employed over a long period for the disproportionation and rearrangment of $CF_2ClCFCl_2$ at a catalyst bed temperature of about 300° C. After about 900 hours of operation, the activity of the catalyst had declined somewhat and the catalyst pellets had turned dark gray to black in color apparently as a result of carbon deposited on the catalyst. The catalyst (200 g. in weight occupying 160 milliliters volume) was regenerated by passing oxygen through the catalyst bed at 100 to 150 milliliters per minute while the catalyst temperature was raised from 300° C. to 400° C. over a period of 18 hours. At 300° C., only a trace of $CO_2$ was detected. At 400° C. 25% $CO_2$ was found in the exit gas initially, this falling off slowly, 10% being measured after 2 hours and virtually nothing after a total of 18 hours. Tests of the activity of the catalyst for the rearrangement and disproportionation of $CF_2ClCFCl_2$ before and after regeneration were made showing that the catalyst activity was increased of the order of 60% by the regeneration treatment, restoring the catalyst close to its initial activity.

When the catalyst was regenerated at a temperature of 450° C. in the same manner and tested in the disproportionation of $C_2Cl_2F_4$ the activity was found to have increased still further, and in this case the regenerated activity was greater than the activity of the catalyst when freshly prepared.

It is to be understood that many other variations and embodiments are included within the scope of the invention in addition to those specifically described above; the embodiments described are for the purpose of illustrating and exemplifying the invention and the invention is not limited thereto.

We claim:

1. A method for preparing a catalyst composition which comprises reacting activated alumina having a highly porous structure and high internal surface area with a lower fluorocarbon having from 1 to about 8 carbon atoms and not more than 1 hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted principally to decomposition products selected from the class consisting of carbon oxides and addition products thereof, and said alumina increases in weight due to the association of fluorine derived from said fluorocarbon therewith, said contacting and the reaction between said fluorocarbon and said alumina being continued until the evolution of said fluorocarbon decomposition products substantially ceases.

2. A method in accordance with claim 1 in which said reaction between said activated alumina and said fluorocarbon is carried out at a temperature of 200° C. to 500° C.

3. A method for preparing a catalyst composition which comprises reacting activated alumina having a highly porous structure and high internal surface area with a fluorocarbon having from 1 to about 8 carbon atoms and containing only elements selected from the class consisting of carbon, fluorine, chlorine and hydrogen and having not more than one hydrogen atom, said reaction being carried out by contacting vapors of said fluorocarbon with said activated alumina at a temperature of the order of 150° to 800° C. sufficiently high to initiate an exothermic reaction between said fluorocarbon and said alumina in the course of which reaction said fluorocarbon is converted principally to decomposition products selected from the class consisting of carbon oxides and addition products thereof, and said alumina increases in weight due to the association of fluorine derived from said fluorocarbon therewith, said contacting and the reaction between said fluorocarbon and said alumina being continued until the evolution of said fluorocarbon decomposition products substantially creases.

4. A method in accordance with claim 3 in which said reaction between said activated alumina and said fluorocarbon is carried out at a temperature of 200° C. to 500° C.

5. A method for preparing a catalyst composition which comprises reacting activated alumina having a highly porous structure and high internal surface area with a perfluorochloroalkane having from 1 to 6 carbon atoms, said reaction being carried out by contacting vapors of said perfluorochloroalkane with activated alumina at a temperature of the order of 200° C. to 800° C. sufficiently high to initiate an exothermic reaction between said perfluorochloroalkane and said activated alumina in the course of which reaction said perfluorochloroalkane is converted principally to decomposition products selected from the class consisting of carbon oxides and addition products thereof, and said alumina increases in weight due to the association of fluorine derived from said perfluorochloroalkane therewith, said contacting and the reaction between said perfluorochloroalkane and said alumina being continued until the evolution of said fluorocarbon decomposition products substantially ceases.

6. A method in accordance with claim 5 in which the reaction between said activated alumina and said perfluorochloroalkane is carried out at a temperature of from 200° C. to 500° C.

7. A method in accordance with claim 5 in which said perfluorochloroalkane contains from 1 to 3 carbon atoms.

8. A method for preparing a catalyst composition which comprises reacting activated alumina having a highly porous structure and high internal surface area with a perfluorochloroalkane having from 1 to 3 carbon atoms, said reaction being carried out by contacting vapors of said perfluorochloroalkane with activated alumina at a temperature of 250° C. to 450° C. sufficiently high to initiate an exothermic reaction between said perfluorochloroalkane and said alumina in the course of which reaction said perfluorochloroalkane in converted principally to decomposition products selected from the class consisting of carbon oxides and addition products thereof, and said alumina increases in weight due to the association of fluorine derived from said perfluorochloroalkane therewith, said contacting and the reaction between said perfluorochloroalkane and said alumina being continued until the evolution of said fluorocarbon decomposition products substantially ceases.

9. A method for preparing a catalyst composition which comprises reacting activated alumina having a highly porous structure and high internal surface area with a fluorocarbon having from 1 to about 8 carbon atoms and having not more than 1 hydrogen atom, said reaction being carried out by passing vapors of said fluorocarbon through a fixed bed of said activated alumina at a temperature of the order of 150° C. to 800° C. sufficiently high to initiate an exothermic reaction between said fluorocarbon and said alumina in the course of which reaction said fluorocarbon is converted principally to decomposition products selected from the class consisting of carbon oxides and addition products thereof, and said alumina increases in weight due to the association of fluorine derived from said fluorocarbon therewith, said reaction releasing heat and creating a hot zone in said bed and continuing the flow of said fluorocarbon through said bed until said hot zone has traveled from the input to the exit end of said bed and the evolution of said fluorocarbon decomposition products from said reaction has substantially ceased.

10. A method in accordance with claim 9 in which said reaction between said alumina and said fluorocarbon is carried out at a temperature of from 200 to 500° C.

11. A method in accordance with claim 9 in which said fluorocarbon is a perfluorochloroalkane having from 1 to 3 carbon atoms.

References Cited in the file of this patent
UNITED STATES PATENTS

| | | |
|---|---|---|
| 2,568,964 | Montgomery et al. | Sept. 25, 1951 |
| 2,848,380 | Thomas | Aug. 19, 1958 |
| 2,939,897 | Beber et al. | June 7, 1960 |